(12) United States Patent
Roelfes et al.

(10) Patent No.: US 12,467,904 B2
(45) Date of Patent: Nov. 11, 2025

(54) METHOD FOR NON-DESTRUCTIVELY TESTING OBJECTS, IN PARTICULAR PLANAR OBJECTS, MADE OF A FIBRE-REINFORCED COMPOSITE MATERIAL

(71) Applicant: ROSEN SWISS AG, Stans (CH)

(72) Inventors: Tobias Roelfes, Spelle (DE); Hanna Krümpel, Neuenkirchen (DE)

(73) Assignee: Rosen IP AG, Stans (CH)

( * ) Notice: Subject to any disclaimer, the term of this patent is extended or adjusted under 35 U.S.C. 154(b) by 341 days.

(21) Appl. No.: 18/002,410

(22) PCT Filed: Jun. 16, 2021

(86) PCT No.: PCT/EP2021/066281
§ 371 (c)(1),
(2) Date: Dec. 19, 2022

(87) PCT Pub. No.: WO2021/255114
PCT Pub. Date: Dec. 23, 2021

(65) Prior Publication Data
US 2023/0228717 A1 Jul. 20, 2023

(30) Foreign Application Priority Data

Jun. 18, 2020 (DE) .................. 102020116 174.3

(51) Int. Cl.
G01N 29/04 (2006.01)
G01N 29/07 (2006.01)
G01N 29/24 (2006.01)

(52) U.S. Cl.
CPC .......... G01N 29/043 (2013.01); G01N 29/07 (2013.01); G01N 29/2412 (2013.01);
(Continued)

(58) Field of Classification Search
CPC .. G01N 29/043; G01N 29/07; G01N 29/2412; G01N 2291/0427;
(Continued)

(56) References Cited

U.S. PATENT DOCUMENTS 6,809,515 B1 * 10/2004 Li ..................... G01R 33/18
324/244
8,037,764 B2 * 10/2011 Kroning ............. G01N 29/2412
324/238

(Continued)

FOREIGN PATENT DOCUMENTS

CN 202330358 U 7/2012
CN 104535655 A 4/2015
(Continued)

OTHER PUBLICATIONS

Murayama, R. et al.: "Conventional electromagnetic acoustic transducer development for optimum Lamb wave modes", Ultrasonics, IPC Science and Technology Press Ltd. Guildford, GB, Bd. 40, Nr. 1-8, May 1, 2002 (May 1, 2002).
(Continued)

*Primary Examiner* — Jacques M Saint Surin
(74) *Attorney, Agent, or Firm* — Husch Blackwell LLP (57) ABSTRACT

A method is provided in which an ultrasonic signal is generated as an electromagnetic ultrasonic signal by the at least one transmitting transducer, which is in the form of an EMUS transducer, by means of a conductive layer arranged on the surface of the object or in said object. An evaluation apparatus is used to utilize the ultrasonic signal detected by the at least one receiving transducer, which is in the form of an EMUS transducer, in order to determine a flaw in the form of a delamination, a porefield or other such two-dimensional inhomogeneities.

17 Claims, 10 Drawing Sheets

(52) U.S. Cl.
CPC ............... *G01N 2291/0231* (2013.01); *G01N 2291/0289* (2013.01); *G01N 2291/0427* (2013.01); *G01N 2291/106* (2013.01)

(58) Field of Classification Search
CPC ..... G01N 2291/0231; G01N 2291/106; G01N 2291/0289
USPC .......................................................... 73/628
See application file for complete search history.

(56) References Cited

U.S. PATENT DOCUMENTS

| | | | | |
|---|---|---|---|---|
| 8,596,129 | B2* | 12/2013 | Niese | G01N 27/90 73/597 |
| 8,677,826 | B2* | 3/2014 | Salzburger | G01N 29/4463 73/598 |
| 10,197,534 | B2* | 2/2019 | Huang | G01N 29/2412 |
| 10,444,202 | B2 | 10/2019 | Flynn et al. | |
| 11,959,817 | B2* | 4/2024 | Yang | G01N 29/2412 |
| 2011/0041612 | A1 | 2/2011 | Paige | |
| 2013/0111999 | A1* | 5/2013 | Dobmann | G01N 29/2412 73/643 |
| 2014/0172399 | A1 | 6/2014 | Ume et al. | |
| 2018/0003680 | A1 | 1/2018 | Kannajosyula et al. | |

FOREIGN PATENT DOCUMENTS

| | | | |
|---|---|---|---|
| CN | 109737899 A | | 5/2019 |
| CN | 111256630 A | | 6/2020 |
| GB | 2545044 A | | 6/2017 |
| JP | S62101009 | * | 5/1987 |
| JP | S63139250 A | | 6/1988 |
| JP | H10232223 A | | 9/1998 |
| JP | H11125622 A | | 5/1999 |
| JP | H11248688 A | | 9/1999 |

OTHER PUBLICATIONS

Schwarz, M. et al.: Nondestructive Testing of a Complex Aluminium-CFRP Hybrid Structure with EMAT and Thermography, In: Journal of Nondestructive Evaluation, vol. 38:35, 2019, S. 1-9, Mar. 2019 (Mar. 12, 2019).

Hsu David K et al, "Applications of Electromagnetic Acoustic Transducers in the NDE of Non-Conducting Composite Materials-Hee Im  and In-Young Yang * ", Jan. 1, 1999 (Jan. 1, 1999), p. 403-413, Retrieved from the Internet: URL: https://link.springer.com/content/pdf/10.1007/BF02939328.pdf, XP055833129.

Amato Silvio et al, "Mane Sklodowska-Cune European Training Network H2020-MSCA-ITN-2016-Grant 722134-NDTonAIR NDTonAIR Continuous Reporting n°20 WP3-Deliverable D21-D3.9: Development of a GW-UT system for testing composite panels from a remote location: Inspection of Composite Aerospace Structures Using Capacitive", Sep. 7, 2018 (Sep. 7, 2018), p. 1-22, Retrieved from the Internet: URL: https://ec.europa.eu/research/participants/documents/downloadPublic?documentIds=080166e5bd754299&appId=PPGMS.

Niese Frank et al, "ZfP heute | Berlin 2020 69 Prüfung von Faserverbundwerkstoffen aus Luftfahrtanwendungen mit elektromagnetischem Ultraschall (EMAT)", Oct. 1, 2020 (Oct. 1, 2020), p. 1-4, Retrieved from the Internet: URL: https://www.ndt.net/article/dgzfp2020/papers/v15.pdf, XP055833134.

* cited by examiner

METHOD FOR NON-DESTRUCTIVELY TESTING OBJECTS, IN PARTICULAR PLANAR OBJECTS, MADE OF A FIBRE-REINFORCED COMPOSITE MATERIAL

CROSS REFERENCE

This application claims priority to PCT Application No. PCT/EP2021/066281, filed Jun. 16, 2021, which itself claims priority to German Patent Application No. 10 2020 116174.3, filed Jun. 18, 2020, the entireties of both of which are hereby incorporated by reference.

FIELD OF THE INVENTION

The present invention relates to a method for nondestructively testing in particular planar objects made of a fiber composite material, preferably in aviation applications, which is in at least single-layer form, wherein a transmitting transducer is used to generate an ultrasonic signal in the object that, after propagating in the object, is detected by means of a receiving transducer.

BACKGROUND OF THE INVENTION

In aviation applications, but also in other industrial fields, fiber composite materials in the form of carbon-fiber-reinforced plastics (CFRP) or glass-fiber-reinforced plastics (GFRP) have increasingly been used for some years to be able to realize particularly lightweight structures. The low empty weight of an aircraft allows the fuel consumption and the associated operating costs to be minimized. However, these fiber composite materials, which have at least one layer provided with fibers, are more difficult than conventional metal materials to test both during the production process and in the event of any recurring inspections. According to the present prior art, these fiber composite materials are predominantly examined using conventional ultrasonic testing techniques, for example by using a suitable carrier medium, such as for example water, to acoustically couple transducers provided with a piezoelectric material to the planar object to be tested, for example a fuselage or wing segment of an aircraft. However, a disadvantage found in this case is that severe sound attenuation, in particular at higher operating frequencies, in the materials present hampers the testing. This leads to poor signal-to-noise ratios, which hampers an amplitude assessment of the signal components reflected or transmitted at a flaw.

BRIEF SUMMARY OF THE INVENTION

It is an object of the present invention to improve the detection of flaws, in particular in the form of delamination, porefields or other two-dimensional inhomogeneities, in a planar object made of a fiber composite material.

The method according to the invention involves the ultrasonic signal being generated as an electromagnetic ultrasonic signal by the at least one transmitting transducer, which is in the form of an EMUS transducer, by means of a conductive layer arranged on the surface of the object or in said object, wherein an evaluation apparatus is used to utilize the ultrasonic signal detected by means of the at least one receiving transducer, which is in the form of an EMUS transducer, in order to determine a flaw in the form of a delamination, a porefield or other such two-dimensional inhomogeneities.

EMUS transducers are electromagnetic ultrasonic transducers and are also referred to as EMAT transducers, "EMAT" standing for "Electromagnetic Acoustic Transducer". In contrast to conventional ultrasonic technology, they involve the use of electromagnetic interactions in order to inject ultrasonic signals into the object, or to be able to tap off said signals therefrom. Essentially, Lorentz forces are a contributing factor here, and also magnetorestriction in the case of ferromagnetic test bodies. In principle, such an EMUS probe or transducer consists of a specially shaped high-frequency coil and a magnetization device, preferably in the form of a magnet yoke comprising permanent magnets. For transmission, the high-frequency coil has a current burst signal applied to it that induces eddy currents in the conductive object close to the surface. As a result of the static magnetic field being overlaid, oscillating Lorentz forces act on the charge carriers and the forces couple to the material lattice and thus serve as the source of the ultrasonic signal. For reception, the whole process then takes place reciprocally.

According to the invention, the eddy currents are produced in a conductive layer that is in particular close to the surface or in particular forms the surface and that extends two-dimensionally in the region to be tested and is initially put on for the test or is already present. Preferably, according to the invention, the conductive layer used in the case of fiber composite materials for aviation applications is the lightning protection mesh often present at or in the surface of the planar object to be tested, which is embedded in the topmost layer of the object as copper mesh, for example. It has been found within the context of the invention that this lightning protection mesh, as a conductive layer, ensures sufficient acoustic coupling. This coupling works particularly well when the material thickness of the electrically conductive component is thicker than the depth of penetration of the electromagnetic field.

The items being tested are planar objects, i.e. objects whose extent in the direction of testing is far greater than in the direction at right angles thereto. For the purposes of analytical consideration, they are infinitely extensive areas, and are actually plates having a size of between one and several dozen square meters, for example. Such a plate e.g. for aircraft fuselages is constructed from a fiber composite material, at least on the exterior to be tested, i.e. has at least one layer of a fiber composite material. This plate need not be completely flat, but rather may also be bent or curved for application purposes.

The fiber composite material may be in single-layer or multilayer form. For aviation applications, there are often five to ten or even more thin layers made of a or various fiber composite materials, which are connected to one another, in particular adhesively bonded or welded to one another.

The result of the method according to the invention is the localization of both a flaw in the x and y directions, i.e. along the surface of the object, and the depth position thereof. In what follows, the depth position is also indicated relative to the total thickness of the layer to be tested; for a 4-mm plate made of a fiber composite material, a position of for example 12.5% or 25% then corresponds to a depth of 0.5 mm or 1 mm below the surface on which the transmitting transducer and the receiving transducer are arranged.

The method according to the invention is preferably suitable for testing for flaws that are longer in the direction of sound propagation than at right angles thereto, i.e. that are larger in the direction parallel to the two-dimensional extent of the object than in the direction of the thickness of the object. In particular, the inhomogeneities have a length of at least twice to three times the wavelength of the generated ultrasonic signal in the direction of sound propagation for determining the depth.

It goes without saying that the detected ultrasonic signal need not be identical to the ultrasonic signal that was generated. While the ultrasonic signal is propagating in the medium, the ultrasonic signal undergoes a variation as a result of flaws that are present, which means that the change in the ultrasonic signal can provide information about the applicable anomaly.

It goes without saying that appropriate control electronics are used for exciting the ultrasonic wave by means of the transmitting transducer. These may be combined with the evaluation apparatus, or at least part of them may be separate therefrom. The EMUS transducers are therefore generally operated by means of a control unit having such control electronics for actuating the transmitting transducer and by means of an evaluation apparatus for the receiving transducer(s). At least some of these parts of an apparatus according to the invention may be operated in a common electronic unit, the evaluation apparatus additionally also being able to have separate EDP means.

In contrast to the nondestructive testing using conventional piezoelectric probes, the testing using EMUS transducers is performed in particular without coupling means, i.e. using the EMUS transducers on the object to be tested is much simpler than doing so in the prior art, in which for example dip tanks are used for objects to be tested in order to achieve good acoustic coupling between the probe transmitting the ultrasonic signal and the object. It also goes without saying that there is often air or an air gap between the EMUS transducers used according to the invention and the object, and that air or an inert gas that may be present is not a coupling means. According to the invention, the acoustic signal is generated not in the transmitting transducer but rather by means of the conductive layer in the object to be tested itself, even though said layer consists of a fiber composite material.

The transmitting transducer is preferably used to produce a guided wave that is able to propagate well in the planar object. In contrast to conventional piezoelectric probes, EMUS transducers are able to generate or detect plate wave modes particularly well with mode purity and selectively.

The transmitting transducers for nondestructive testing are preferably used to produce Lamb waves or guided SH waves, with in particular the A0 mode or the S0 mode being produced. For the fiber composite materials used, excitation frequencies between 10 (inclusive) and 1000 (inclusive) kHz have shown themselves to be particularly efficient. More advantageously, the excitation frequencies are in the range from 50 to 500 kHz and in particular also in the range from 200 to 220 kHz, this applying in particular to plates having a thickness of between 2 and 8 mm, preferably 4 mm, and a wavelength of between 4 and 8 mm, preferably 6 mm.

The flaw is preferably determined by virtue of the local phase velocity and/or the local wavelength of the received ultrasonic signal at the location of the receiving transducer being determined in the evaluation apparatus and used to determine the depth of the flaw. The local wavelength is the wavelength of the ultrasonic signal at that position of the object at which the receiving transducer is located on or above the surface of the object, i.e. the receiving transducer and the ultrasonic signal associated with the local wavelength are situated on a vertical with respect to the surface of the object. The same applies to the local phase velocity. When a surface is oriented horizontally with respect to the ground, the transducer is located on the upper side of the object to be tested, for example, in which case the ultrasonic signal is then directly beneath the latter. The invention exploits the fact that, when an ultrasonic signal of a guided wave encounters an inhomogeneity in the plate and this inhomogeneity also runs in the direction of sound propagation, the physical constraints change, which means that there are effects on the propagation of the wave mode or of the ultrasonic signal.

The method according to the invention furthermore exploits the fact that, when a flaw extends two-dimensionally in the direction of ultrasound propagation, the energy of the original ultrasonic signal is split and varied ultrasonic signals propagate above and below in the region of the flaw. A change in the plate thickness relevant to the original ultrasonic signal then leads to a shift of operating point in the dispersion graph that indicates a relationship between plate thickness, wavelength and also fiber and group velocity and also frequency. Since frequency is deemed a conserved quantity in a linear system, the phase velocity thus imperatively changes, which is synonymous with a change in the trace wavelength. The operating point shift's accompanying change of phase velocity or of wavelength of the ultrasonic signal locally between the flaw and the surface on which or at which the receiving transducer is arranged is detected by the latter, which means that the position of the receiving transducer in the x and y directions corresponds to the position of the flaw accordingly in the x and y directions. The x and y directions correspond to the two-dimensional extent of the object, the x direction preferably corresponding to the direction of measurement and to the direction of propagation preferably considered for the ultrasonic signal.

As will be explained in more detail below, the flaw position is determined for example by way of grid-like scanning of an object to be examined as appropriate or by means of a preferably multichannel receiving transducer of locally applicable extent or an array of receiving transducers.

Furthermore, a material-specific correlation of the flaw depth with the phase velocity and/or with the wavelength is preferably used to determine the flaw depth. In particular for A0 or S0 Lamb modes that are to be used as a preference, the result is that the closer the delamination is positioned to the surface, the shorter the wavelength and the sharper the change of wavelength or change of phase velocity of the guided ultrasonic wave signal. Such a material-specific or composite-material-specific correlation may be determined experimentally beforehand or may also be determined by simulation given knowledge of the structure of the composite material.

The flaw is advantageously determined by performing at least one spatial Fourier transformation of the detected ultrasonic signal over at least part of a measuring section of the receiving transducer (at a specific time). It goes without saying that, depending on the design of the receiving transducer or probe, this may initially require a plurality of measurements along this measuring section. The length of the measuring section with the ultrasonic signal to be evaluated for the Fourier transformation is preferably at least 1 cm, more preferably at least 2 cm. An upper limit is preferably 5 cm or more preferably 4 cm. Proceeding from the transmitting transducer, the section scanned by the receiving transducer is thus tested gradually by sections $\Delta x$ of applicable size. This is performed gradually, which means that for example a 6-cm portion to be checked is tested 6 times in the case of a transducer whose x resolution in the direction of measurement is 1 cm.

The results of the Fourier transformation are then available in the k space, i.e. in the wavenumber space, there being a shift in the maximum of the wavenumber amplitude in the region of a two-dimensionally extending flaw or anomaly, since in this region the wavelength of the guided wave changes, i.e. becomes shorter.

If a plurality of spectra have been determined at different times in the direction of measurement, the maximum of the wavenumber and/or phase velocity may advantageously be determined or otherwise read from an in particular statistical consideration of the ascertained spectra at different times. In a simple case, such a statistical evaluation is for example the formation of the arithmetic mean from the absolute-value square of the spectra, from which it is then possible to derive the wavenumber v of the maximum and, from the relationship $v=1/\lambda$, the wavelength $\lambda$.

According to one advantageous refinement of the method according to the invention, flaws at a depth of between 0% and in particular 50% of the thickness of the object are tested by using the A0 mode of a Lamb wave. The A0 mode, as a flexural wave of the object under consideration, may be excited particularly well by means of EMUS transducers and has no cut-off frequency below which it is no longer capable of propagation. 0% corresponds to the surface of the object on which the transducers are arranged.

As an alternative or in addition to testing flaws by means of the A0 mode of a Lamb wave, flaws may also be tested using an S0 mode of a Lamb wave. In particular, flaws at a depth of between 50% and 100% of the thickness of the object, but also between 0% and 50%, may be tested by initially using the S0 mode of a Lamb wave, the A0 mode that results from the S0 mode in the region of a flaw additionally being used for evaluation. The accompanying sharp change in the phase velocity may be detected particularly well.

The receiving transducer is preferably moved in a direction of propagation of the ultrasonic signal and/or a linear array comprising one or more combined receiving transducers is used, the spatially greater coverage of the measuring section by means of the linear array allowing at least some of the relative movement of the receiver with respect to the transmitter to be saved. In the case of an excitation pulse (also pulse burst), the use of a plurality of receiver means arranged in succession in the direction of measurement leads to a more or less simultaneous plurality of measurements for the respective positions. In particular, a linear array containing multiple receiving transducers arranged in succession, each having one or more receiving channels, is able to cover spatially larger measuring sections more quickly.

A phased-array transmitting transducer may likewise be used to specifically excite a direction of propagation. Otherwise, the direction of propagation preferably corresponds to the direction of measurement or testing, i.e. the direction in which the receiving transducer(s) are moved, and this should involve a rectilinear movement along the surface away from or towards the receiving transducer.

In general, the EMUS receiving transducer is moved in a defined manner in the direction of propagation or counter to the direction of propagation of the guided wave and, at each position, an A-scan is taken, a plurality of A-scans being combined to produce a data matrix. These data are then used to perform a temporospatial Fourier transformation. The dispersion relationship and therefore the desired quantities are then obtained at the operating point of the respective receiving transducer.

Besides the A0 and/or S0 Lamb modes that are preferably used, higher-order Lamb wave modes and modes of guided SH waves are also suitable. For an A0 Lamb mode, the result is for example that the closer the delamination is positioned to the surface, the shorter the wavelength and the sharper the change of wavelength or change of phase velocity of the guided ultrasonic wave in the region of the flaw. This is correlated with the position of the receiver, which means that the position of the receiver is vertically above the position of the flaw and indicates the x and y positions of the flaw.

The object presented at the outset is also achieved by way of an apparatus for performing the method described above or below, this apparatus comprising a transmitting transducer, a receiving transducer and an evaluation apparatus, and the receiving transducer being designed to detect various wavelengths, i.e. being capable of operating over a wide bandwidth in the wavenumber space/k space. By contrast, the transmitting transducer is designed to specifically excite precisely one wavelength, i.e. it operates over a narrow bandwidth in the wavenumber space.

It goes without saying that, as is customary, a transmitting or receiving transducer also includes possible enclosures, cables or other aspects for forming the probe that is then used during operation. Transmitting and receiving transducers should therefore each be read as having one or more transmitting transducers and/or one or more receiving transducers, synonymously with a probe.

Various variants for forming a receiving transducer operating over a wide bandwidth are conceivable; a receiving transducer is particularly preferably designed in such a way that it comprises a magnetization device, which is preferably formed by a magnet yoke comprising at least one permanent magnet, and at least one conductor, which merely comprises a conductor loop, formed by one or more windings, with supply and return paths that, during operation, run in particular at right angles to the direction of testing. Instead of permanent magnets, electromagnets may also be used, provided that, for the purpose of exciting the desired modes, the magnetic field thereof can be regarded as static or quasistatic.

The supply and return paths of the receiving transducer are the, by way of example, coil-type windings of an electrical conductor in which a voltage or an electric current is induced. A supply path may be formed by one or more conductor lines oriented parallel to one another. These conductor lines of the at least one electrical conductor are preferably closely or densely packed and have their insulating layers touching. A return path is a number of one or more conductor lines running parallel to such a supply path that are appropriately connected to the supply paths by way of redirection. The use of precisely one conductor with a conductor loop means that a receiving channel is designed to detect various wavelengths and the receiving transducer is of wideband design. Known EMUS receiving transducers, which have conductor lines meandering at a specific interval, are designed to detect specific wavelengths. These receiving transducers provided for evaluating effects of reflection and transmission are of narrowband design, rather than wideband as in the case of the present invention.

During operation, i.e. for a measurement with the receiving transducer suitably oriented with respect to the surface of the object to be tested, the supply and return paths are arranged parallel to this surface and above one another with reference thereto, i.e. in a view along the surface and in particular in the direction of travel or direction of sound propagation the supply and return paths are situated above one another on a vertical with respect to the surface (surface oriented parallel to the ground). In particular, the supply and return paths are spaced apart from one another in a range of between 1 to 5 mm, preferably 2 to 4 mm, so that no induction effects arise in the part that is at a greater distance from the surface. It goes without saying that the supply and return paths merge into one another in the edge regions thereof and the supply and return paths are spaced apart in the middle part.

To form a linear array, the latter is provided with a plurality of receiving transducers that are arranged in succession in the direction of testing or beside one another and are combined with one another, with, based on the above, at least one applicable supply and return path being arranged as a sensor element between the poles of a respective magnet yoke. Said paths are again arranged above one another with reference to the surface.

At least two of the magnet yokes may preferably have a common ferromagnetic connector, allowing the apparatus to be constructed in a simplified manner. In particular if two magnet yokes situated beside one another share a pole, the receiving transducers formed thereby are combined with one another or integrated with one another. Accordingly, the poles of a linear array design of this kind, which need to be arranged close to the surface and are situated in succession or beside one another, are alternating in order to produce magnetic fields in the object that run as horizontally as possible, i.e. in the two-dimensional extent of the object. A common ferromagnetic connector allows the magnetic circuit to be made on the side of the receiving transducer that is remote from the surface of the object in order to form a compact array of linear transducers.

According to one development according to the invention, at least two conductor loops forming independent receiving channels may preferably be arranged between the poles of at least one magnet yoke and regardless of whether a receiving transducer having one or more magnet yokes is involved, each of the supply and return paths of said conductor loops again running parallel. Small, in particular winding-related deviations from this parallelism are ignored in this case. These supply and return paths are generally each formed by a separate conductor. As such, for example three magnet yokes formed in succession may form six receiving channels. Depending on the distance between the conductor loops in the direction of measurement, the linear array may then have a local resolution that is between 1 mm and 5 mm, for example.

Viewed in the direction of measurement, the magnet yokes are preferably situated in succession. However, it is also possible to use at least two linear arrays that are beside one another in the direction of measurement, as a result of which they form a matrix of receiving transducers and cover a larger region. If necessary, multiple transmitting transducers situated beside one another are then likewise used to excite the Lamb wave.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

The features explained below from the exemplary embodiments according to the invention may also be the subject matter of the invention individually or in combinations other than those shown or described. Where appropriate, parts having functionally identical effects are provided with identical reference numerals.

Figure 1:
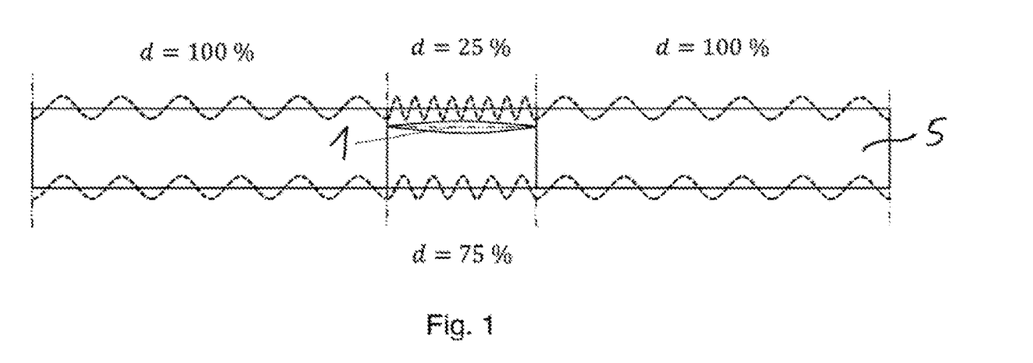
FIG. 1 shows a change of wavelength of a guided wave at a delamination in a composite material.
Figure 2:
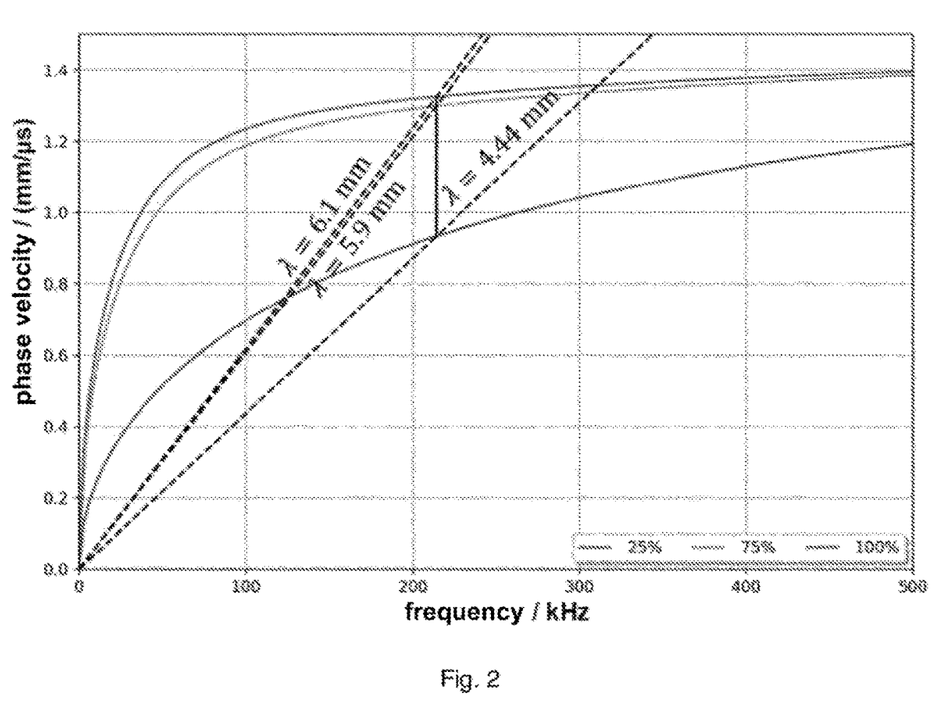
FIG. 2 shows a dispersion curve relating to an A0 mode for 100%, 75% and 25% plate thickness.

The method according to the invention is based on the effect shown in FIG. 1 that the local phase velocity or local wavelength changes in the region of a flaw 1 in the form of a two-dimensionally extending inhomogeneity, in the present case a delamination, at a depth of 25% of a thickness d of a planar object 5 made of fiber composite material. The inhomogeneity extends two-dimensionally in the direction of the object, which is in the form of an aircraft fuselage element, for example. In the regions having a thickness d of 100% to the left and right of the flaw 1 shown, there is a wavelength λ of 6 mm. Above the delamination, i.e. toward the side on which a receiving transducer and a transmitting transducer need to be arranged, the thickness of the object is 25%; accordingly, 75% of the composite material thickness is beneath the delamination. Whereas these constraints mean that the resultant local wavelength λ of the ultrasonic signal is 6 mm to the left and right of the flaw, said wavelength is reduced to λ=4.44 mm in the region of the delamination. This local wavelength change may be detected using an apparatus according to the invention or the method according to the invention. The change of wavelength of the guided wave in the region of the 25% thickness of the plate, i.e. between the upper surface in FIG. 1 and the flaw 1, results from the dispersion curve for a specific frequency, which in the present case, purely by way of example, is 210 kHz; in particular, the frequency for objects having an overall thickness up to 8 mm is preferably in a range between 200 kHz and 220 kHz (FIG. 2).

Figure 11:
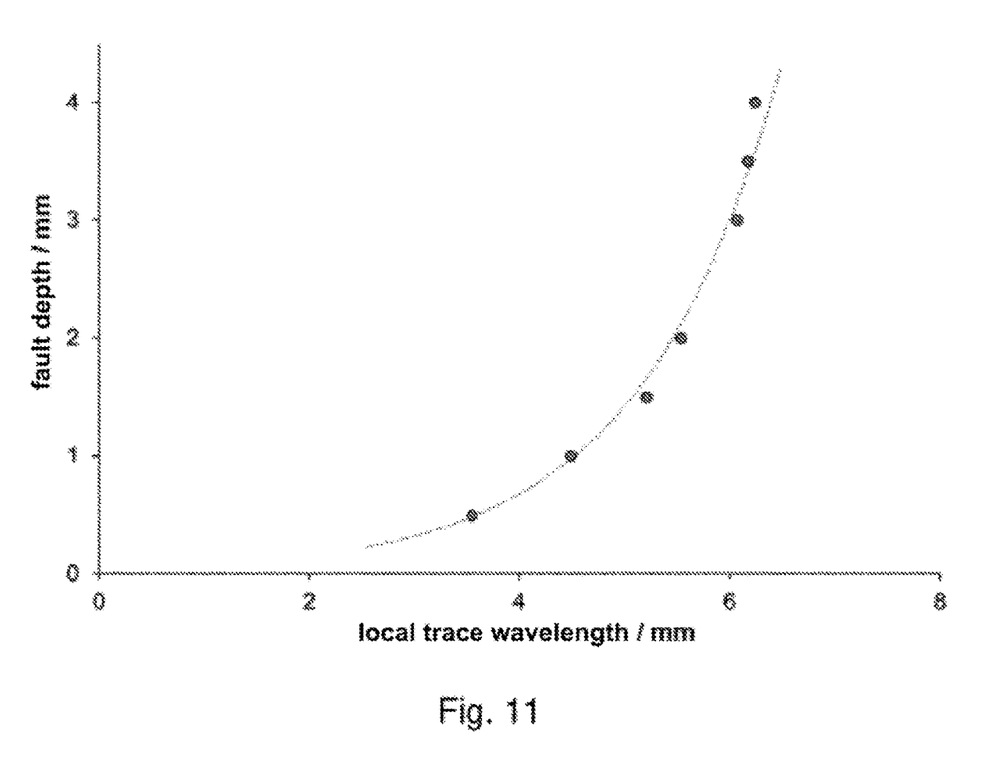
FIG. 11 shows a calibration curve for the evaluation in the method according to the invention.

For the A0 Lamb mode excited in the present case, the result is that the closer the delamination is to the surface, the shorter the wavelength and the sharper the change of wavelength of the guided ultrasonic wave. For the object in the form of a 4-mm CFRP plate used in the present case and an A0 mode, FIG. 11 shows this relationship by way of example, the detected local trace wavelength, i.e. the trace wavelength produced in the region of the flaw 1, or wavelength λ=4.44 mm, being associated with a depth of approximately 0.5 mm, i.e. the delamination is at 12.5% of a thickness of 4 mm.

Figure 3:
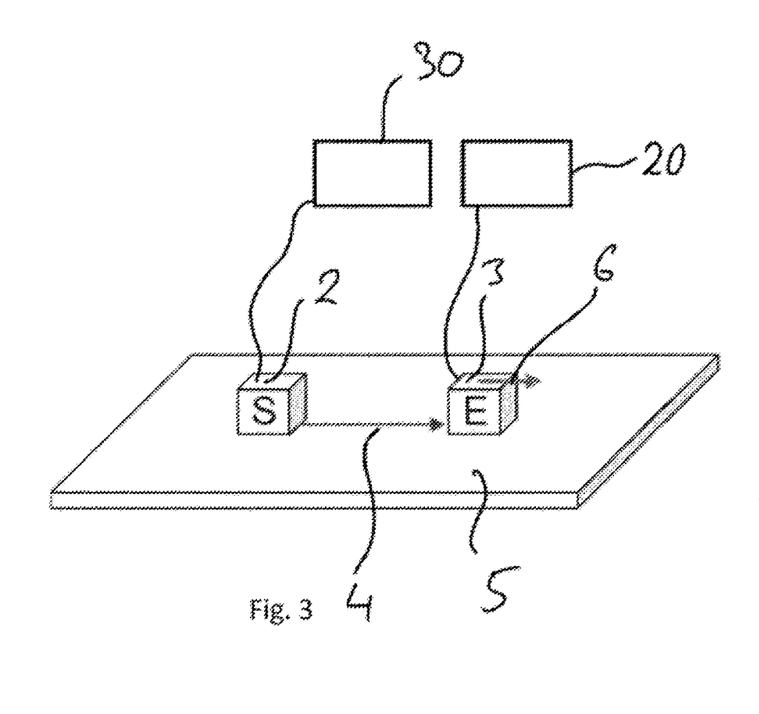
FIG. 3 shows a schematic probe arrangement having a transmitting transducer and a receiving transducer.
Figure 4:
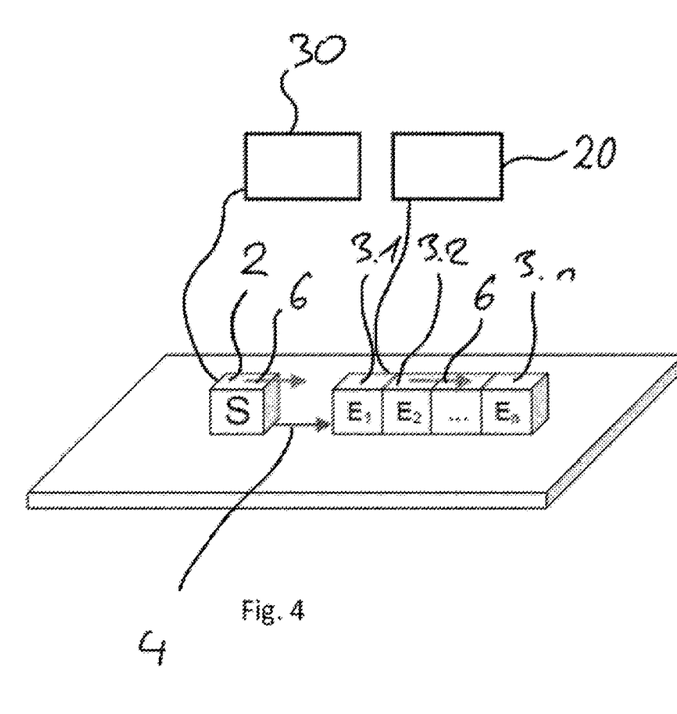
FIG. 4 shows a schematic probe arrangement having a transmitting transducer and a linear array.

FIGS. 3 and 4 show schematic representations of the apparatus having a transmitting transducer 2 and a receiving transducer 3 or a transmitting transducer 2 and a linear array comprising multiple receiving transducers 3.1, 3.2 to 3.n. The EMUS transducers are operated by means of a control unit 30 for actuating the transmitting transducers 2 and by means of an evaluation apparatus 20 at the receiving transducer(s). The evaluation apparatus 20 is intended to receive the ultrasonic signal and may additionally also have separately, i.e. remotely, arranged EDP means. An arrow 4 indicates the direction of sound propagation and the direction of measurement in an object 5. According to the invention, the receiving transducer(s) (FIG. 3) are moved in the direction of sound propagation according to arrow 6, and, for each accordingly predefinable position of the desired resolution, a shot from the transmitting transducer 2 is detected and a so-called A-scan is taken. The A-scans show the time characteristic of the signal amplitude at the location of the receiver. Multiple A-scans may be combined to produce a data matrix (B-scan, FIG. 5), as a result of which multiple spatial Fourier transformations may be performed at different times. From these, the dispersion relationship and thus ultimately the desired sizes are obtained at the operating point, i.e. at the location of the receiver. The method is performed quite similarly according to the variant shown in FIG. 4, albeit that here a receiving transducer combination containing receiving transducers 3.1, 3.2 to 3.$n$ as a linear array receives the, possibly varied, ultrasonic signal from a single shot each time. Depending on the measurement point resolution of the setup shown in FIG. 3, the spatial resolution in this instance may be somewhat reduced compared to this, since the receiver coils are at a firmly predefined distance from one another and therefore the resolution of the linear array is predefined. Subsequently, the linear array may likewise again be moved according to arrow 6. If one does not wish to measure the same place repeatedly using different receivers 3.1 to 3.$n$ of the same linear array, e.g. in order to improve the resolution, the array is moved in the direction of propagation 4 by the total length of the array in each case.

Figure 5:
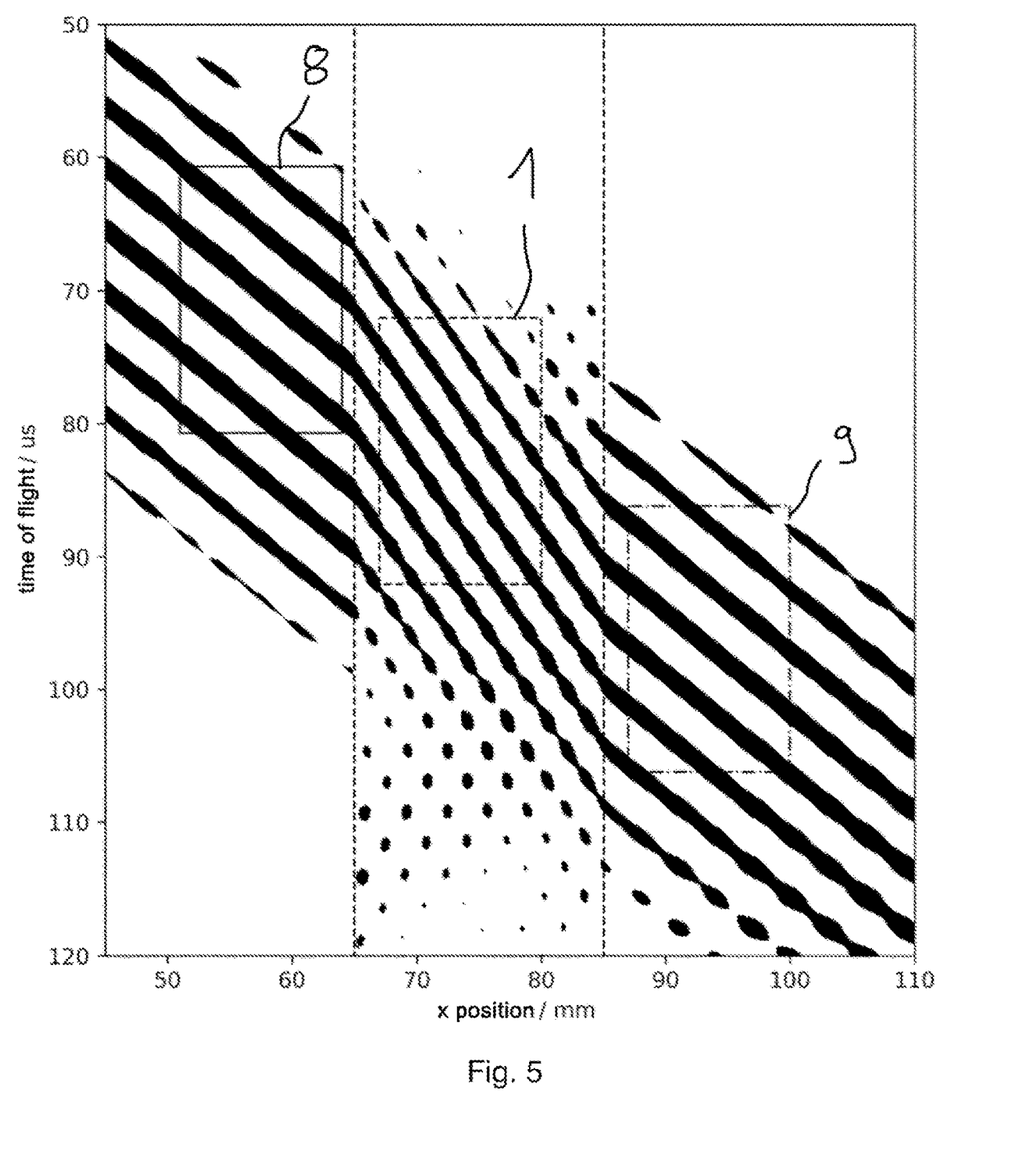
FIG. 5 shows a B-scan containing a region provided with a flaw.

As an example, FIG. 5 shows the amplitude of the detected ultrasonic signal in the so-called B-scan for a defect close to the surface at a depth of 12.5%, the distance of the receiving transducer 3 from the transmitting transducer 2 along the measuring section x being plotted on the x axis. The y axis is the time of flight of the detected signal. A discernible variation occurs in the ultrasonic signal, the region of the flaw 1 that is used for the evaluation being shown by a dashed box. Flaw-free regions before and after the flaw 1 along the measuring section that are used for the evaluation are shown by a box 8 having a solid line and by a box 9 having a dash-dot line.

Figure 6:
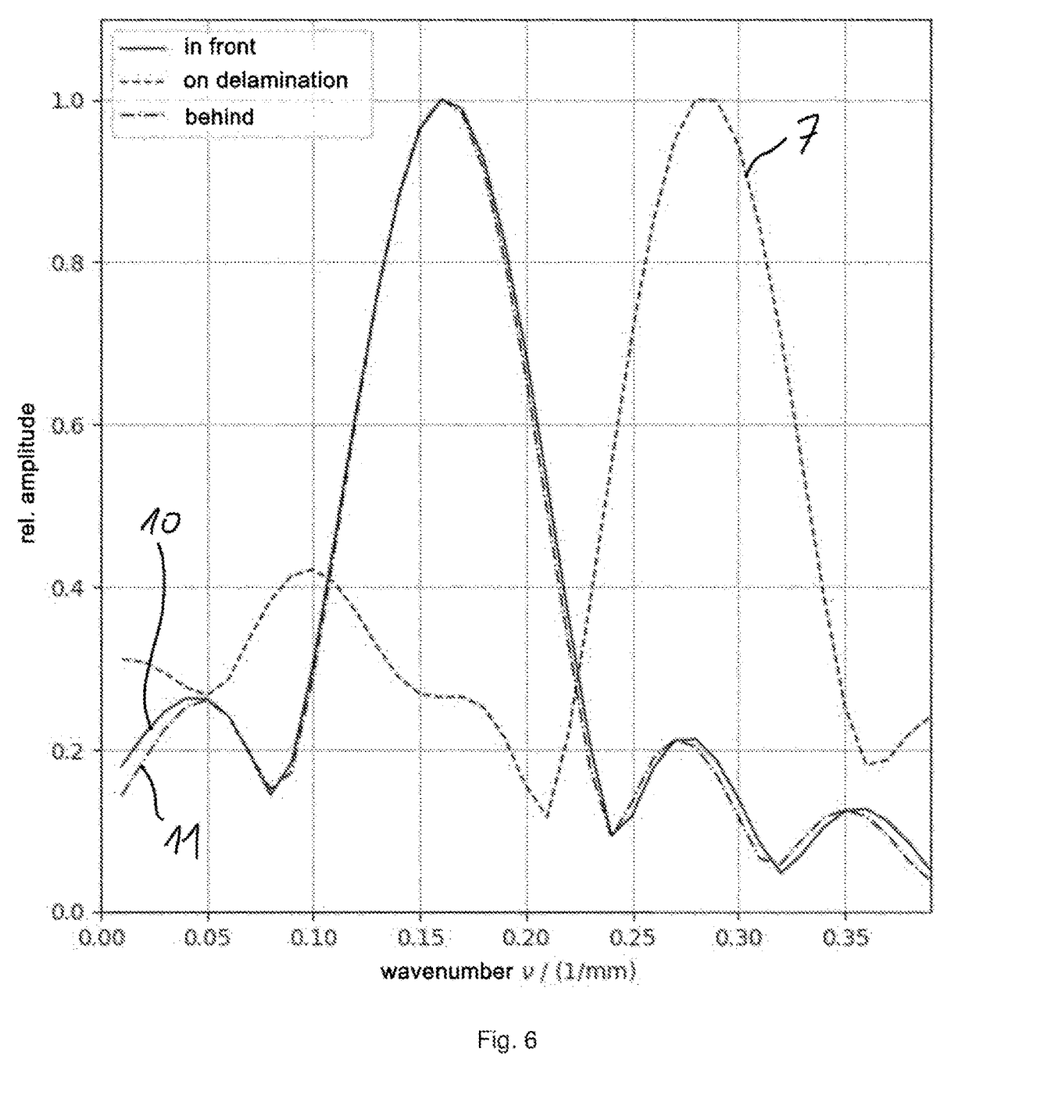
FIG. 6 shows the wavenumber shifts ascertained using the method according to the invention.

The amplitudes in the wavenumber spectrum that are ascertained for the flaw 1 are shown accordingly as a dashed curve 7 in the associated FIG. 6; the wavenumber spectra associated with the framed regions 8 and 9 (solid and dash-dot lines) are shown more or less above one another as solid and dash-dot lines 10 and 11. It is then possible to use the relationship in FIG. 11, which has been determined experimentally as an example on the basis of a large number of experiments for the materials to be examined, to determine the depth of the flaw from the ascertained wavenumber. The calibration curve shown in FIG. 11 may be stored for a multiplicity of composite materials in a database which the evaluation device is able to access, or which is stored in the evaluation apparatus.

Figure 7:
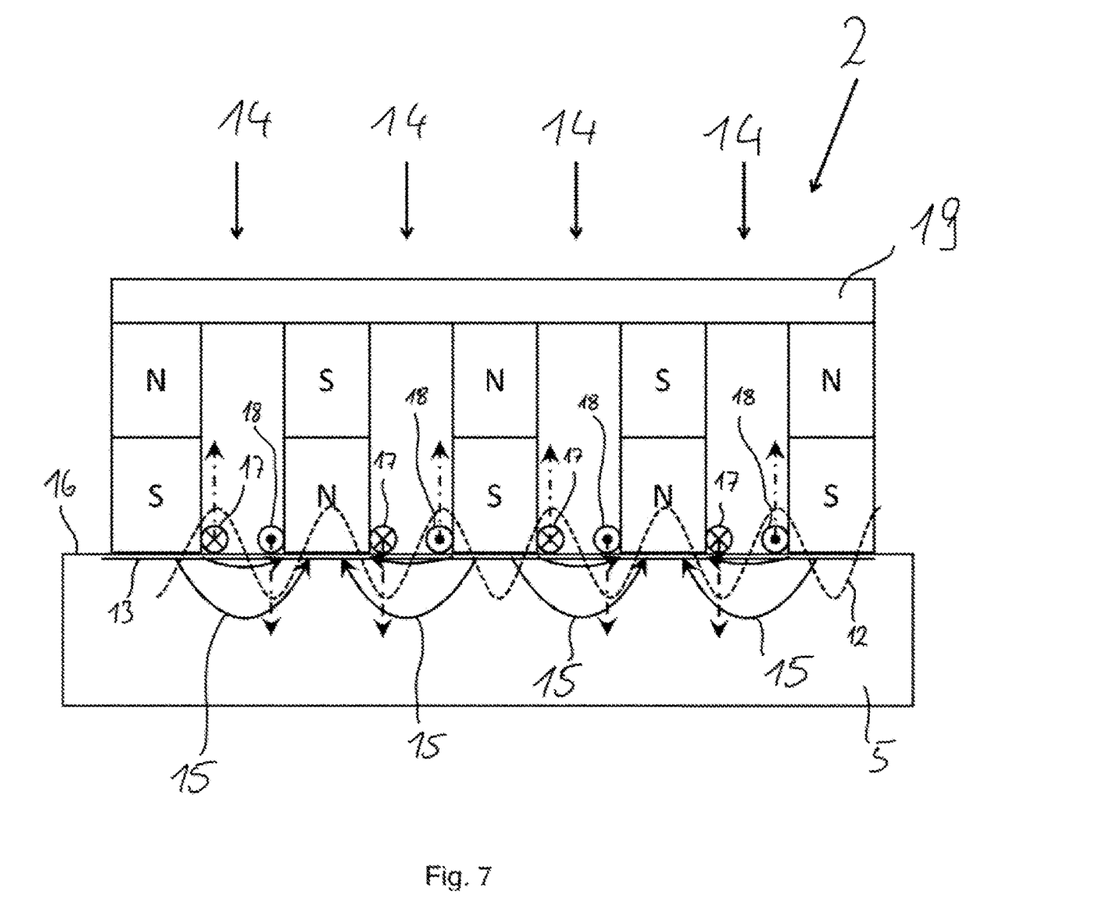
FIG. 7 shows part of an apparatus according to the invention in the form of a transmitting transducer.

Excitation of a guided mode A0 is known to require the forces to act vertically on the plate; using the Lorentz force, a vertical force may then act on the test body, for which purpose the magnetic field and the eddy current are oriented at a tangent to the plate, however. This is what the transmitting transducer shown in FIG. 7 is designed for, which in this FIG. 7 is shown in a position bearing against or a position resting on the object 5. The dashed curve 12 shows the deflection of the excited A0 mode. A conductive layer 13 in the form of a lightning protection mesh is shown as a solid line and is embedded in the object 5, which is shown as a single layer. As a result, the layer 13 is acoustically coupled to the further regions of the object 5.

The transmitting transducer 3 shown, which is actuated by control electronics 30 (cf. FIGS. 3 and 4), which are not shown further, additionally comprises a plurality of magnet yokes 14, the north and south poles of which are denoted by N and S. The resultant magnetic field lines 15 run comparatively parallel to the surface 16 of the object. Conductor pieces 17 run into the plane of the figure with indicated directions of current flow, and further conductor pieces 18 run out of the plane of the figure with indicated directions of current flow. Conductor pieces 17 and 18 are spaced apart between the magnet poles in such a way that an A0 mode is excited at a specific excitation frequency.

As in the case of the receiving transducer, the magnet yokes 14 may have a common ferromagnetic connector 19 and may thus be constructed in a simpler and more compact manner.

Figure 8:
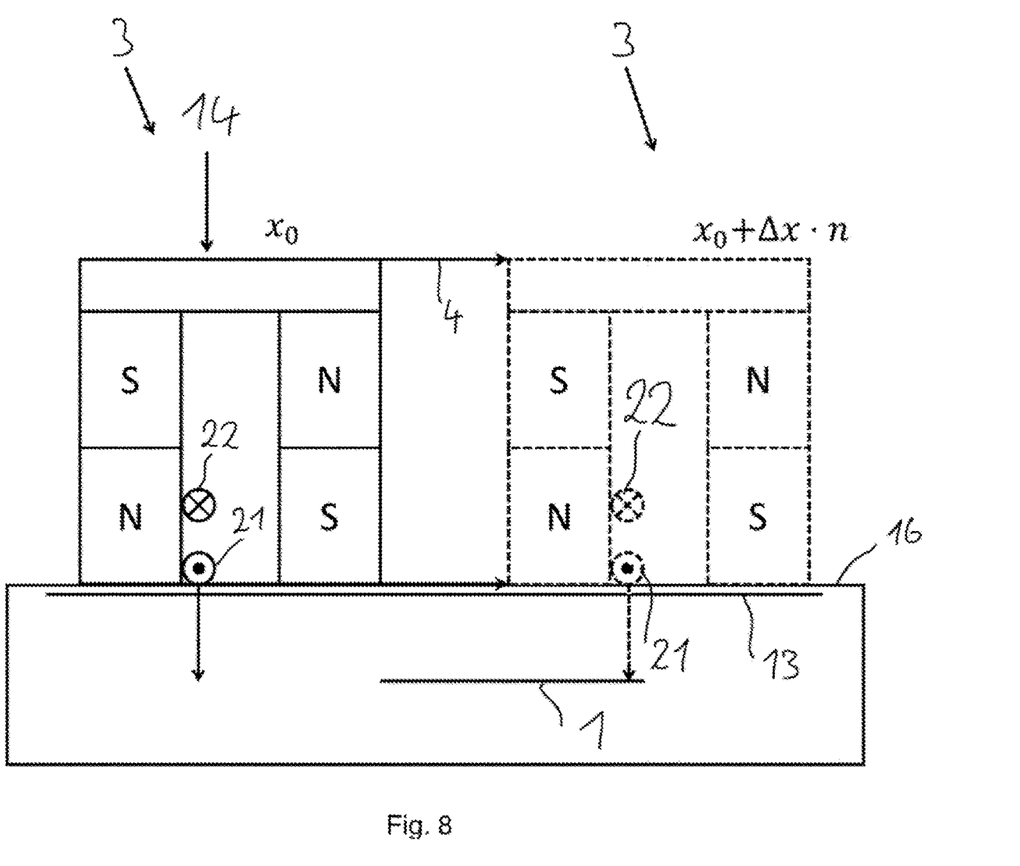
FIG. 8 shows a view with part of an apparatus according to the invention in the form of a receiving transducer.
Figure 9:
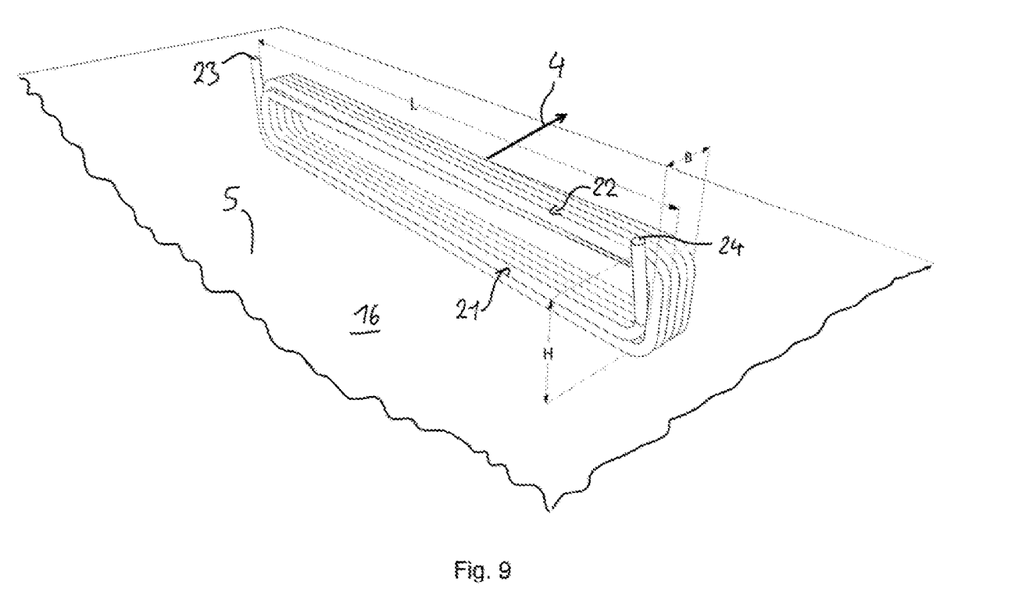
FIG. 9 shows a partial detail from a receiving transducer according to the invention.

FIG. 8 shows a receiving transducer according to the invention at a first position x0 (left-hand representation of the receiving transducer) and at a position x0+Δx·n, the receiving transducer having a supply path 21 and a return path 22 between each of the poles of the magnet yoke 14, said paths each being formed by a plurality of windings of a conductor loop (cf. FIG. 9). Δx is the step size between individual measurements, and n is the number of steps. Using the conductive layer 13 in the form of an image protection mesh, the receiving transducer samples the local wavelength of the ultrasonic signal propagated in the object 5 and detects the flaw 1, in the present case at the location x0+Δx·n, by means of the change in the wavelength. The receiving transducer 3 is of wideband design. An exemplary form of a conductor loop having a supply path 21 and a return path 22 is shown in FIG. 9, a conductor loop of coil-type design forming the supply path 21 with a total of ten lower winding sections and forming the return path 22 with 10 upper winding sections. The connections 23 and 24 of the conductor usually lead to RC− and RC+ elements of the evaluation apparatus, via which the induced currents are then tapped off and supplied to further evaluation. In the present case, the total width B viewed in the direction at right angles to the direction 4 is between 0.5 mm and 1.5 mm, in particular 1 mm, the length L of the conductor loop is between 8 and 12 mm, in the present case preferably 10 mm, and the overall height of the conductor loop is H equals 3 mm in order to avoid induction effects in the conductor line return path 22.

With reference to a vertical onto the surface of the object 5, the supply and return paths are situated above one another in a spaced-apart manner.

Figure 10:
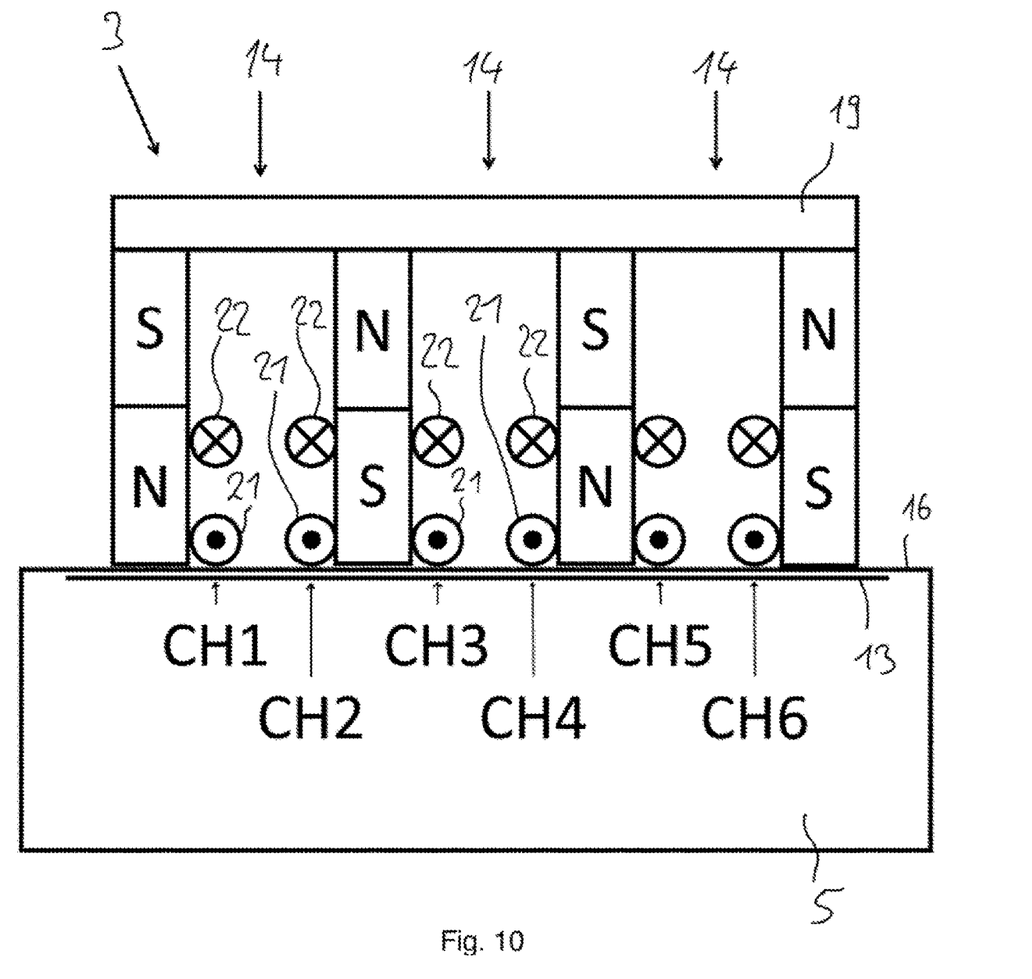
FIG. 10 shows a further receiving transducer in a side view above an object.

A receiving transducer combination in the form of a linear array as shown in FIG. 10 is provided with a number of six channels operating independently of one another that are each formed by conductor loops as described previously. These channels CH1 to CH6 in the form of individual conductor loops are each arranged in twos between poles of respective magnet yokes 14. The linear array likewise has a ferromagnetic connector 19 for the magnetic circuit, and the respective conductor loops or supply and return paths 21 and 22 formed between two poles of a magnet yoke are spaced apart by around 1 mm. Such a receiving transducer combination corresponds to a receiving transducer having units 3.1, 3.2 and 3.3 as shown in FIG. 4.

In summary, the method according to the invention may be used to detect the position of defects relevant to aviation in fiber composite materials by using selectively guided ultrasonic wave modes and to record the depth. Mode conversion effects and operating point shifts in the mode spectrum are recorded locally and the adverse signal-to-noise ratios in the fiber composite materials present are avoided in the amplitude assessment of reflected and/or transmitted ultrasonic signals. Defects up to a minimum diameter of 3 mm may be identified in this case.

The invention claimed is:

1. A method for nondestructively testing objects made of a fiber composite material which is in at least single-layer form, the method comprising:
   generating, via a transmitting transducer in the form of an EMUS transducer, an electromagnetic ultrasonic signal in the object by a conductive layer arranged on a surface of the object or in the object,
   detecting propagation of the ultrasonic signal in the object by a receiving transducer in the form of an EMUS transducer;
   determining, by an evaluation apparatus utilizing the ultrasonic signal detected by the at least one receiving transducer, a flaw in the form of a delamination, a porefield or other such two-dimensional inhomogeneities;
   wherein the flaw is determined by virtue of a local phase velocity and/or a local wavelength of the received ultrasonic signal at a location of the receiving transducer being determined in the evaluation apparatus and used to determine the depth of the flaw.

2. The method as claimed in claim 1, wherein the testing method is performed without coupling means.

3. The method as claimed in claim 1, wherein the transmitting transducer is used to produce a guided wave.

4. The method as claimed in claim 1, wherein a material-specific correlation of a depth of the flaw with the phase velocity and/or with the wavelength is used to determine the flaw depth.

5. The method as claimed in claim 4, wherein the flaw is determined by performing at least one spatial Fourier transformation of the detected ultrasonic signal over at least part of a measuring section of the receiving transducer.

6. The method as claimed in claim 5, wherein a maximum of the wavenumber and/or the phase velocity is determined from a consideration of the ascertained spectra at different times.

7. The method as claimed in claim 1, wherein flaws at a depth of between 0% and up to 50% of a thickness of the object are tested by using the A0 mode of a Lamb wave.

8. The method as claimed in claim 1, wherein flaws are tested by initially using an S0 mode of a Lamb wave, an A0 mode that results from the S0 mode in a region of a flaw additionally being used for evaluation.

9. The method as claimed in claim 1, wherein the receiving transducer is moved in the direction of propagation of the ultrasonic signal and/or a linear array comprising one or more receiving transducers is used.

10. An apparatus for performing the method as claimed in claim 1, the apparatus comprising:
    a transmitting transducer,
    a receiving transducer, and
    an evaluation apparatus,
    wherein the receiving transducer detects various wavelengths.

11. The apparatus as claimed in claim 10, wherein the receiving transducer comprises:
    at least one magnetization device, and
    at least one conductor, which merely comprises a conductor loop, formed by one or more windings, with supply and return paths.

12. The apparatus as claimed in claim 11, wherein during operation the supply and return paths are arranged parallel to a surface of the object to be tested and above one another with reference thereto.

13. The apparatus as claimed in claim 12, further including a plurality of receiving transducers arranged in succession in a direction of testing or beside one another and are combined with one another, in order to form a linear array.

14. The apparatus as claimed in claim 12, wherein at least two magnet yokes of the combined receiving transducers have a common ferromagnetic connector.

15. The apparatus as claimed in claim 14, wherein at least two conductor loops forming independent receiving channels are arranged between the poles of at least one magnet yoke, each of the supply and return paths of said conductor loops running parallel.

16. The method as claimed in claim 1, wherein the objects are planar objects.

17. A method for nondestructively testing objects made of a fiber composite material which is in at least single-layer form, the method comprising:
    generating, via a transmitting transducer in the form of an EMUS transducer, an electromagnetic ultrasonic signal in the object by a conductive layer arranged on a surface of the object or in the object,
    detecting propagation of the ultrasonic signal in the object by a receiving transducer in the form of an EMUS transducer;
    determining, by an evaluation apparatus utilizing the ultrasonic signal detected by the at least one receiving transducer, a flaw in the form of a delamination, a porefield or other such two-dimensional inhomogeneities;
    wherein the transmitting transducer is used to produce a guided wave; and
    wherein the flaw is determined by virtue of a local phase velocity and/or a local wavelength of the received ultrasonic signal at a location of the receiving transducer being determined in the evaluation apparatus and used to determine the depth of the flaw.

\* \* \* \* \*